United States Patent [19]

Kautz et al.

[11] 3,723,765

[45] Mar. 27, 1973

[54] LINEAR FREQUENCY DETECTOR FOR ANALOG TO DIGITAL CONVERTER

[75] Inventors: Robert F. Kautz, Spring Lake; Leo B. Bourgeault, New Bedford Rd., Wall Township, both of N.J.

[73] Assignee: The Bendix Corporation

[22] Filed: May 25, 1971

[21] Appl. No.: 146,762

[52] U.S. Cl. .................. 307/233, 324/78 E, 328/32, 328/140
[51] Int. Cl. .............................................. G01r 25/00
[58] Field of Search ........ 307/233, 295, 318; 328/31, 328/32, 136, 140; 324/78 E, 78 J, 189

[56] References Cited

UNITED STATES PATENTS

| | | | |
|---|---|---|---|
| 3,184,606 | 5/1965 | Ovenden et al. | 307/233 |
| 3,539,827 | 11/1970 | Crowe | 307/295 X |
| 2,867,767 | 1/1959 | McGillem et al. | 324/78 E |
| 3,171,978 | 3/1965 | Weber | 307/318 X |
| 3,197,560 | 7/1965 | Riesz | 324/78 X |
| 3,304,515 | 2/1967 | Stieler | 328/31 X |
| 3,402,303 | 9/1968 | Painter | 307/318 X |

*Primary Examiner*—Stanley T. Krawczewicz
*Attorney*—S. H. Hartz

[57] ABSTRACT

A device for converting an alternating current signal to a direct current voltage having an amplitude linearly proportional to the frequency of the signal in which the signal is converted to a square wave and the square wave is differentiated to provide pulses corresponding to the differential of the signal and the differentiated pulses are summed to provide the direct current voltage.

5 Claims, 1 Drawing Figure

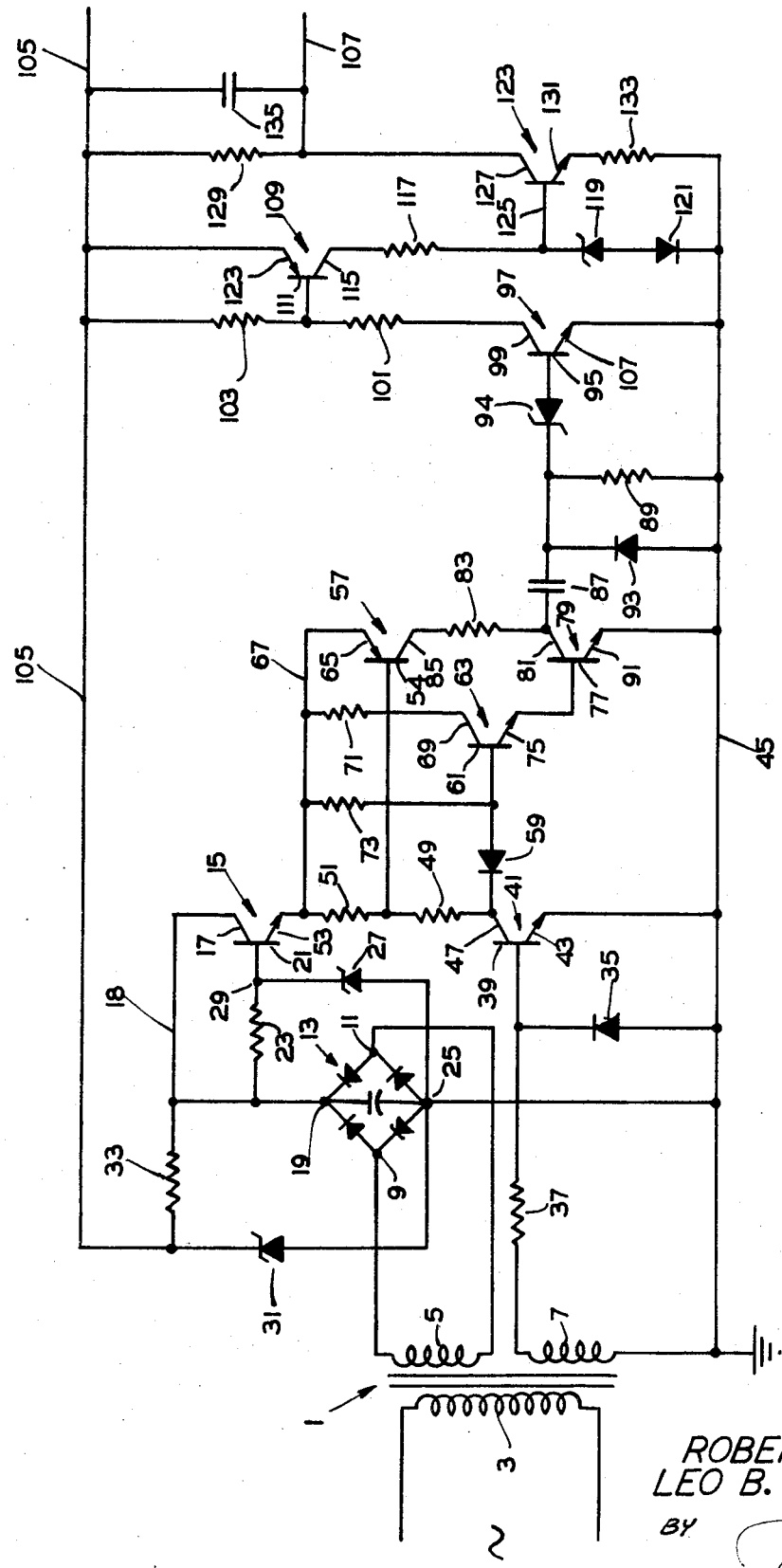

LINEAR FREQUENCY DETECTOR FOR ANALOG TO DIGITAL CONVERTER

The invention relates to frequency detectors and, more particularly, to a frequency detector for providing a direct current voltage having an amplitude which is a function of the frequency.

Frequency detectors as used heretofore were complicated and were used where high accuracy was not a requirement. A detector constructed according to the invention is relatively simple in construction and provides a highly accurate direct current voltage having an amplitude which is linearly proportional to the frequency of the alternating current voltage.

The invention contemplates a frequency detector comprising means for converting an a.c. input signal to a square wave, differentiating means connected to the converting means for differentiating the square wave and providing pulses corresponding to the differential of the alternating current input signal, and summing means connected to the differentiating means for summing the differentiated pulses and providing an output having an amplitude linearly proportional to the frequency of the a.c. input signal.

These and other advantages of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The single FIGURE of the drawing is a schematic diagram showing a frequency detector constructed according to the invention for providing a direct current voltage having an amplitude linearly proportional to the frequency of an a.c. signal.

Referring to the drawing, the novel frequency detector constructed according to the invention and shown therein has an input transformer 1 having a primary winding 3 and a pair of secondary windings 5, 7. Primary winding 3 is connected to a source of alternating current input voltage whose frequency is to be detected. Secondary winding 5 is connected to opposing input terminals 9, 11 of a full wave diode bridge rectifier 13 for providing collector voltage to the transistors in the circuit.

A transistor 15 has its collector 17 connected through a lead 18 and its base 21 connected through a resistor 23 to an output terminal 19 of bridge rectifier 13. The opposing output terminal 25 of bridge rectifier 13 is connected by a Zener diode 27 and resistor 23 and by a Zener diode 31 and a resistor 33 to opposing output terminal 19 for stabilizing the collector voltage.

A half wave rectifier, including a diode 35 and a resistor 37, is connected through a common lead 45 across secondary winding 7 of transformer 1 and applies the positive half cycles of the alternating current to the base 39 of a transistor 41 connected to the junction of diode 35 and resistor 37. Emitter 43 of transistor 41 is connected to common lead 45. Collector 47 of transistor 41 is connected by series connected resistors 49, 51 to emitter 53 of transistor 15, and by resistor 49 to the base 54 of a transistor 57, and by a diode 59 to the base 61 of a transistor 63.

Emitter 65 of transistor 57 is connected by a lead 67 to the emitter 53 of transistor 15. Collector 69 of transistor 63 is connected through a resistor 71 to lead 67, and base 61 of transistor 63 is connected through a resistor 73 to lead 67. Emitter 75 of transistor 63 is connected to the base 77 of a transistor 79. Collector 81 of transistor 79 is connected to a differentiating circuit including a capacitor 87 and resistors 83 and 89. Resistor 83 is connected to the collector 85 of transistor 57 and resistor 89 is connected through common lead 45 to the emitter 91 of transistor 79. A diode 93 connects capacitor 87 to common lead 45 and provides a discharge path for capacitor 87 when transistor 79 is conducting.

With the arrangement described, transistor 41 conducts during the positive half cycles of the a.c. input signal and forward biases transistor 57 through resistor 49 so that transistor 57 provides a square wave at its collector 85. The negative half cycles of the a.c. input signal pass through diode 35 and resistor 37 so that during the negative half cycles transistor 41 is reverse biased and the base drive current is removed from transistor 57 and neither of the transistors conduct during the negative half cycles. The square wave at collector 85 of transistor 57 is differentiated by the differentiating circuit, including capacitor 87 and resistors 83 and 89, to provide differentiated pulses at its output at the junction of capacitor 87 and resistor 89.

While transistor 41 is non-conducting, transistor 63 conducts and forward biases transistor 79 which provides a discharge path for capacitor 87 through ground lead 45 and diode 93. The positive going portion of the differentiated pulse is clipped by a Zener diode 94 connected to the junction of resistor 89 and capacitor 87 and to the base 95 of a transistor 97. The positive going portion of the differentiated pulse provides base drive for transistor 97. The value of Zener diode 94 is selected in connection with the r.c. time constant of the differentiating circuit to provide a suitable pulse width to facilitate summing the pulses.

Transistor 97 has its collector 99 connected through series resistors 101 and 103 to lead 105 which is connected to Zener diode 31. The emitter 107 of transistor 97 is connected to common lead 45.

A transistor 109 has a base 111 connected to the junction of series resistors 101 and 103, an emitter 123 connected to lead 105 and a collector 115 connected through a series connected resistor 117, a Zener diode 119 and a diode 121 to common lead 45.

A transistor 123 has a base 125 connected to the junction of resistor 117 and Zener diode 119, a collector 127 connected through a resistor 129 to lead 105 and an emitter 131 connected through a resistor 133 to common lead 45. Also, a capacitor 135 is connected to lead 105 and to a lead 107 connected between collector 127 and resistor 129. The output signal having an amplitude linearly proportional to the frequency of the input a.c. signal is taken across capacitor 135 on leads 105 and 107.

Transistor 97 conducts during the positive differentiated pulses and forward biases transistor 109 through resistor 101. Transistor 109 squares up the positive differentiated pulses.

Transistor 123 and resistor 129 comprise an emitter follower to provide a constant current for charging capacitor 135. Capacitor 135 is charged at a rate per unit time proportional to the input frequency and the output is taken across the capacitor on the terminals 105, 107. The output has an amplitude linearly proportional to the frequency of the a.c. input signal.

The frequency detector described herein and constructed according to the invention is relatively simple in construction and provides a highly accurate d.c. voltage having an amplitude which is linearly proportional to the frequency of the a.c. voltage.

What is claimed is:

1. A frequency detector for converting an alternating current signal to a d.c. voltage having an amplitude corresponding to the frequency of the a.c. signal comprising:

means for converting the a.c. signal to a square wave including a half-wave rectifier for producing a pulsating d.c. voltage and switching means connected to the half-wave rectifier for converting the pulsating d.c. voltage to a square wave, differentiating means connected to the converting means for differentiating the square wave and providing pulses corresponding to the differential of the alternating current input signal, and summing means connected to the differentiating means for summing the differentiated pulses and providing an output having an amplitude linearly proportional to the frequency of the a.c. input signal.

2. A device as described in claim 1 in which the means for converting the pulsating d.c. voltage to a square wave includes a pair of transistors.

3. A device as described in claim 1 in which the differentiating means includes a resistor and a capacitor.

4. A frequency detector for converting an alternating current signal to a d.c. voltage having an amplitude corresponding to the frequency of the a.c. signal comprising:

means for converting the a.c. signal to a square wave, differentiating means connected to the converting means for differentiating the square wave and providing pulses corresponding to the differential of the alternating current input signal, and a Zener diode connected to the output of the differentiating means to provide a pulse width suitable for summing the pulses, and summing means connected to the differentiating means for summing the differentiated pulses and providing an output having an amplitude linearly proportional to the frequency of the a.c. input signal.

5. A device as described in claim 4 in which the summing means includes a capacitor for summing the differentiated pulses and the output is taken across the capacitor.

* * * * *